(12) United States Patent
Foo et al.

(10) Patent No.: US 8,684,267 B2
(45) Date of Patent: *Apr. 1, 2014

(54) METHOD FOR BROADCASTING A MAGNETIC STRIPE DATA PACKET FROM AN ELECTRONIC SMART CARD

(75) Inventors: Eric Foo, Thousand Oaks, CA (US); Joan Ziegler, Tiburon, CA (US); Mark Poidomani, Windermere, FL (US); Lawrence Routhenstein, Ocoee, FL (US); Ziv Alon, Newbury Park, CA (US); Charles McGuire, Newbury Park, CA (US)

(73) Assignee: PrivaSys, Tiburon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,680

(22) Filed: Apr. 3, 2012
(Under 37 CFR 1.47)

(65) Prior Publication Data

US 2012/0187199 A1 Jul. 26, 2012

Related U.S. Application Data

(63) Continuation-in-part of application No. 13/102,991, filed on May 6, 2011, now Pat. No. 8,231,063, which is a continuation of application No. 12/726,868, filed on Mar. 18, 2010, now Pat. No. 7,954,724, which is a continuation of application No. 11/413,595, filed on Apr. 27, 2006, now abandoned, which is a continuation-in-part of application No. 11/391,719, filed on Mar. 27, 2006, now abandoned, application No. 13/438,680, which is a continuation of application No. 12/944,504, filed on Nov. 11, 2010, now Pat. No. 8,317,103, which is a continuation-in-part of application No. 12/822,031, filed on Jun. 23, 2010, now Pat. No. 8,226,001.

(60) Provisional application No. 60/675,388, filed on Apr. 27, 2005.

(51) Int. Cl.
*G06K 7/08* (2006.01)

(52) U.S. Cl.
USPC .......... 235/449; 235/450; 235/451; 235/492; 235/493

(58) Field of Classification Search
USPC ................. 235/380, 449, 451, 492, 493, 450
See application file for complete search history.

(56) References Cited

U.S. PATENT DOCUMENTS 4,353,064 A  10/1982  Stamm
4,394,654 A  7/1983  Hoffmann-Cerfontaine (Continued)

FOREIGN PATENT DOCUMENTS

JP  62-274387 A  11/1987
JP  62-279994 A  12/1987

(Continued)

*Primary Examiner* — Tuyen K Vo
(74) *Attorney, Agent, or Firm* — Roy L. Anderson; Wagner, Anderson & Bright, P.C.

(57) ABSTRACT

Method for broadcasting a magnetic stripe data packet from an electronic card by measuring a swipe speed of the electronic card past a magnetic reader head during a swipe of the electronic card past the magnetic reader head and then adjusting a broadcast signal containing the magnetic stripe data packet according to the measured swipe speed so that the magnetic stripe data packet in the broadcast signal is read by the magnetic reader head during said swipe.

20 Claims, 12 Drawing Sheets

Fig. 1

(56) References Cited

U.S. PATENT DOCUMENTS

| | | |
|---|---|---|
| 4,529,870 A | 7/1985 | Chaum |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,272,596 A | 12/1993 | Honore et al. |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman et al. |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,748,737 A | 5/1998 | Daggar |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,163,771 A | 12/2000 | Walker et al. |
| 6,176,430 B1 | 1/2001 | Finkelstein et al. |
| 6,182,894 B1 | 2/2001 | Hackett et al. |
| 6,189,098 B1 | 2/2001 | Kaliski, Jr. |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski, Jr. et al. |
| 6,313,724 B1 | 11/2001 | Osterweil |
| 6,323,770 B1 | 11/2001 | Dames |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,641,050 B2 | 11/2003 | Kelley et al. |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,769,618 B1 | 8/2004 | Finkelstein |
| 6,776,332 B2 | 8/2004 | Allen et al. |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,853,412 B2 | 2/2005 | Stephenson |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,143,953 B2 | 12/2006 | Takahashi et al. |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,237,724 B2 | 7/2007 | Singleton |
| 7,246,752 B2 | 7/2007 | Brown |
| 7,278,586 B2 | 10/2007 | Takahashi et al. |
| 7,298,243 B2 | 11/2007 | Juels et al. |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Liu et al. |
| 7,359,507 B2 | 4/2008 | Kaliski, Jr. |
| 7,360,688 B1 | 4/2008 | Harris |
| 7,363,494 B2 | 4/2008 | Brainard et al. |
| 7,380,710 B2 | 6/2008 | Brown |
| 7,389,425 B2 | 6/2008 | Hasbun |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,532,104 B2 | 5/2009 | Juels |
| 7,543,739 B2 | 6/2009 | Brown et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,641,124 B2 | 1/2010 | Brown et al. |
| 7,660,902 B2 | 2/2010 | Graham et al. |
| 7,690,580 B2 * | 4/2010 | Shoemaker .................. 235/493 |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0105964 A1 | 6/2003 | Brainard et al. |
| 2003/0116635 A1 | 6/2003 | Taban |
| 2003/0152253 A1 | 8/2003 | Wong |

(56) References Cited

U.S. PATENT DOCUMENTS

| | | |
|---|---|---|
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty et al. |
| 2004/0162732 A1 | 8/2004 | Rahim et al. |
| 2004/0172535 A1 | 9/2004 | Jakobsson et al. |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2005/0247787 A1* | 11/2005 | Von Mueller et al. ........ 235/449 |
| 2006/0000900 A1 | 1/2006 | Fernandes et al. |
| 2006/0037073 A1 | 2/2006 | Juels et al. |
| 2006/0041759 A1 | 2/2006 | Kaliski, Jr. et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0186209 A1 | 8/2006 | Narendra et al. |
| 2006/0256961 A1 | 11/2006 | Brainard et al. |
| 2007/0114274 A1 | 5/2007 | Gibbs et al. |
| 2007/0174614 A1 | 7/2007 | Duane et al. |
| 2007/0192249 A1 | 8/2007 | Biffle et al. |
| 2007/0241201 A1 | 10/2007 | Brown et al. |
| 2008/0040271 A1 | 2/2008 | Hammad et al. |
| 2008/0040276 A1 | 2/2008 | Hammad et al. |
| 2008/0096326 A1 | 4/2008 | Reed |
| 2008/0116285 A1* | 5/2008 | Shoemaker .................... 235/493 |
| 2008/0121726 A1* | 5/2008 | Brady et al. ................... 235/493 |
| 2008/0148394 A1 | 6/2008 | Poidomani et al. |
| 2008/0308641 A1* | 12/2008 | Finn ............................... 235/492 |
| 2009/0108064 A1 | 4/2009 | Fernandes et al. |
| 2009/0255996 A1 | 10/2009 | Brown et al. |
| 2009/0272815 A1* | 11/2009 | Tanner et al. ................. 235/492 |
| 2011/0266354 A1* | 11/2011 | Poidomani et al. ........... 235/492 |

FOREIGN PATENT DOCUMENTS

| | | |
|---|---|---|
| JP | 63-073198 A | 4/1988 |
| WO | WO9852735 | 11/1998 |
| WO | WO0247019 A1 | 6/2002 |
| WO | WO2006105092 | 10/2006 |
| WO | WO2006116772 | 11/2006 |

* cited by examiner

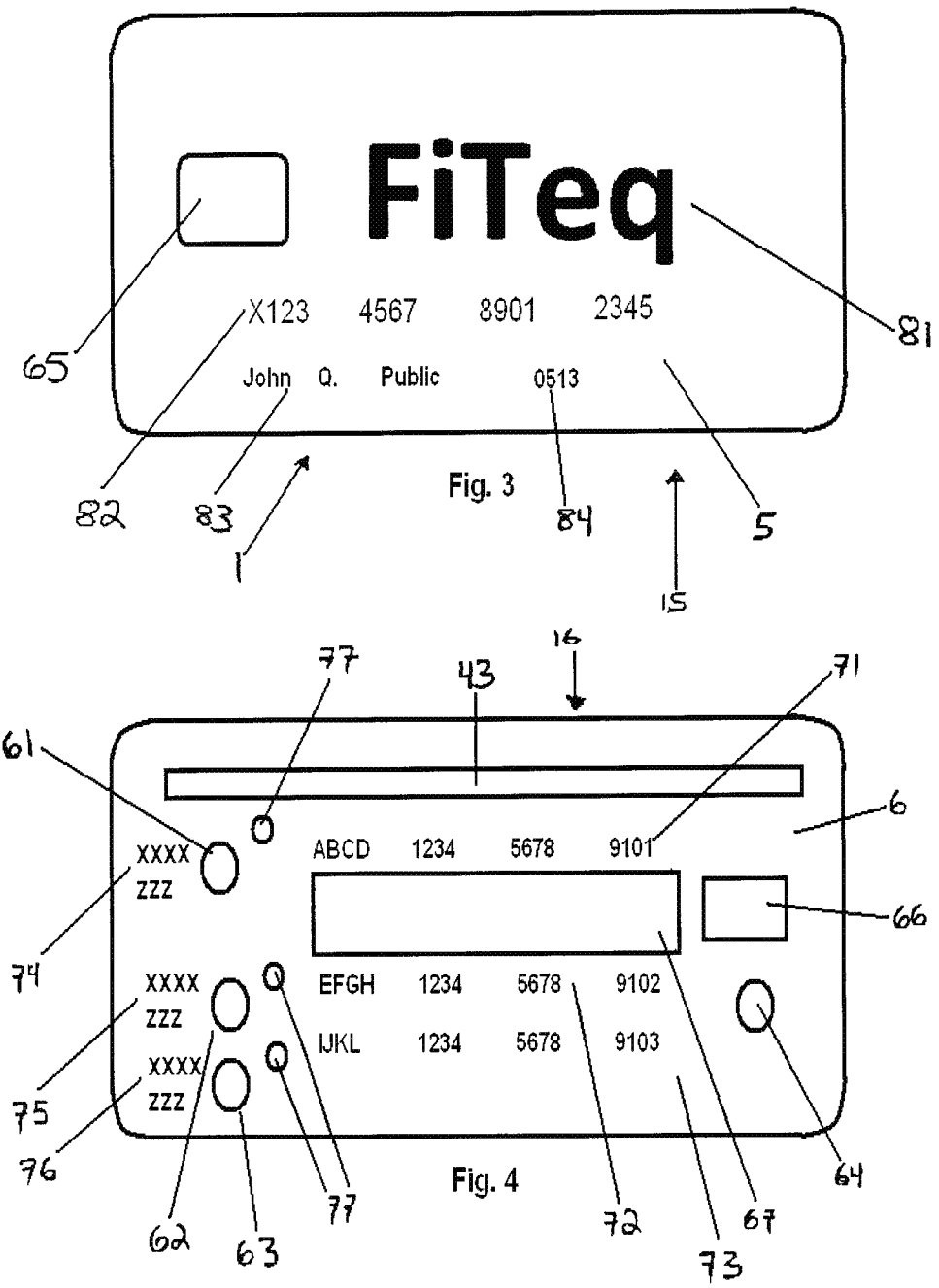

MCU measures the number of charge transfer cycles and determines the speed using the touch-profile method

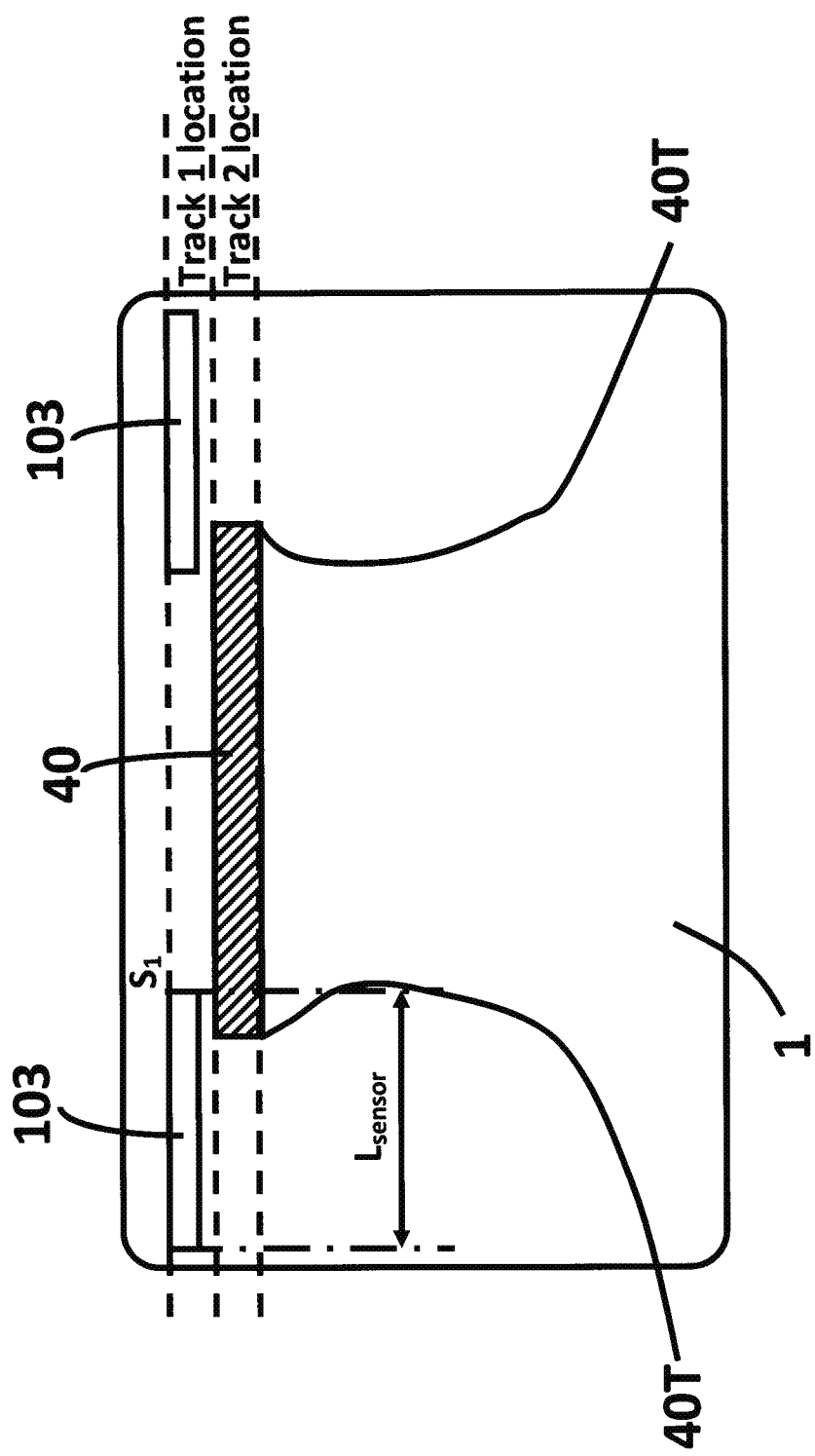

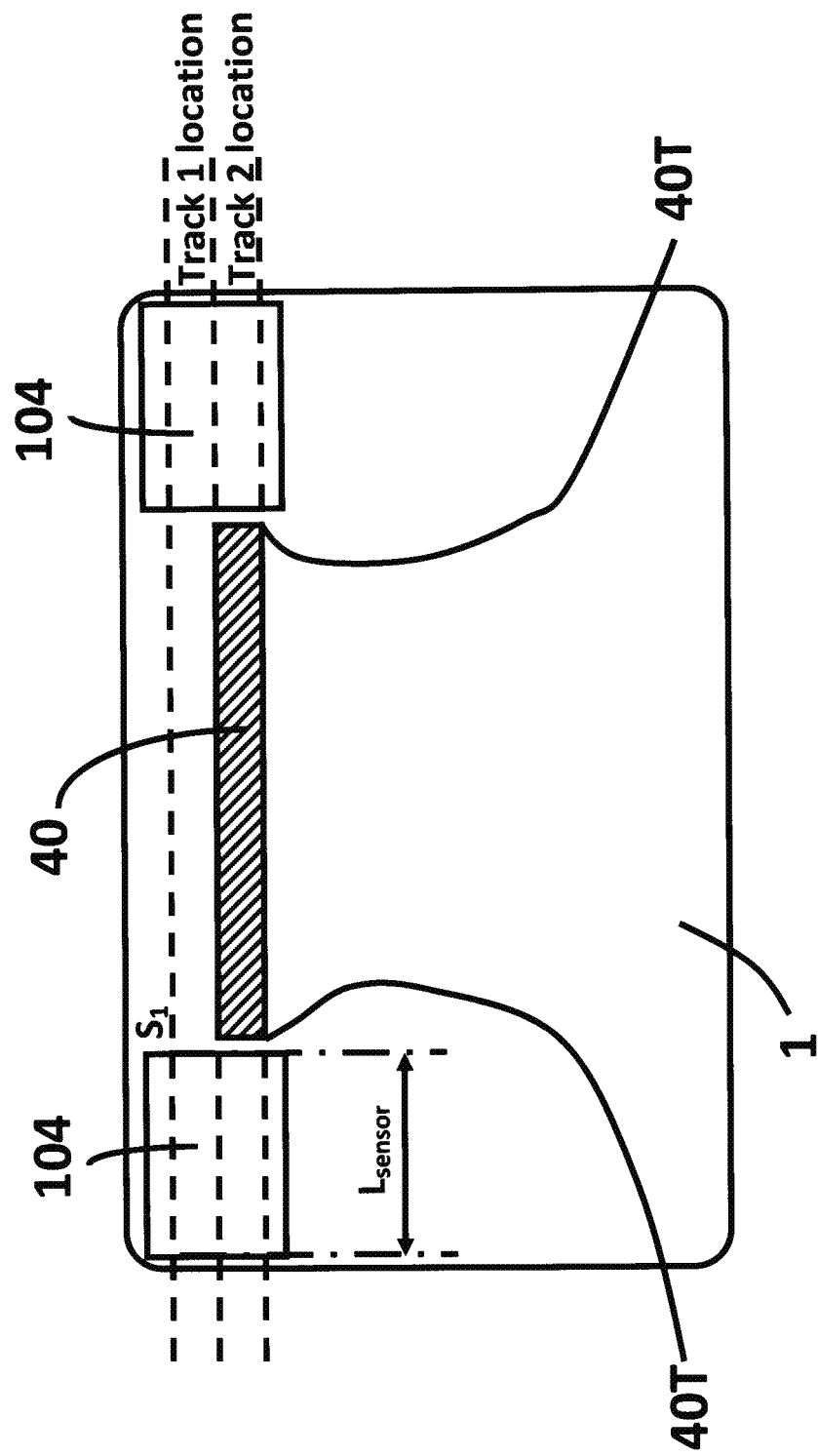

METHOD FOR BROADCASTING A MAGNETIC STRIPE DATA PACKET FROM AN ELECTRONIC SMART CARD

CROSS-REFERENCE TO RELATED APPLICATIONS

The present application is a continuation of U.S. Ser. No. 12/944,504, filed Nov. 11, 2010, which was a continuation-in-part application of U.S. patent application Ser. No. 12/822,031, filed Jun. 23, 2010, the disclosures of which are specifically incorporated herein by reference. The present application is also a continuation-in-part of U.S. patent application Ser. No. 13/102,991, filed May 6, 2011, which is a continuation of U.S. Ser. No. 12/726,868, now issued as U.S. Pat. No. 7,954,724, which was a continuation application of U.S. Ser. No. 11/413,595, filed Apr. 27, 2006, which was a continuation-in-part application of U.S. Ser. No. 11/391,719, filed Mar. 27, 2006 and which also claimed the priority benefit of U.S. Ser. No. 60/675,388, filed Apr. 27, 2005, all of which are specifically incorporated herein by reference.

FIELD OF THE INVENTION

The present invention is in the field of electronic smart cards, and more particularly to an electronic smart card that can broadcast a magnetic stripe data packet so that it can be read by a magnetic card reader during a swipe of the electronic card.

BACKGROUND OF THE INVENTION

The United States primarily relies upon credit and debit cards having no electronics that are readable by a magnetic stripe card reader. Outside the United States, many countries rely upon smart cards that do not contain a magnetic stripe but are readable by smart card readers. Each option has its advantages and disadvantages, and there are many reasons why both cards currently exist.

It has long been desired to create a single card usable both inside the United States with magnetic stripe readers and outside the United States with smart card readers that offers the advantages of both cards while minimizing the disadvantages of both cards. Such a card not only has the promise of saving billions of dollars a year in fraud, but it also has the promise of opening many other uses for the card, and generating enormous savings related to combining multiple cards into a single card. Yet, to date, it does not exist.

The prior art includes many patents that propose just such a card, but none has yet been commercialized. Given the long felt need for such a card, and the enormity of the problems it could solve, and the attempts by a great many to solve the problems associated with creating such a card, one has to ask why such a card is not yet available. The reasons are many. Cost and manufacturability are two primary reasons why such a card has not yet been commercialized, but there are other reasons as well. Such reasons include, but are not limited to, reasons relating to security, privacy, standards, and several other issues that must be addressed before such a card can be widely deployed.

The present invention recognizes and solves a problem that has prevented electronic smart cards from broadcasting a magnetic stripe data packet readable by a magnetic card reader during a swipe of the electronic card past a magnetic reader head.

SUMMARY OF THE INVENTION

The present invention is generally directed to a method for broadcasting a transaction specific magnetic stripe data packet from an electronic card by measuring a swipe speed of the electronic card past a magnetic reader head during a swipe of the electronic card past the magnetic reader head and then adjusting a broadcast signal containing the magnetic stripe data packet according to the measured swipe speed so that the magnetic stripe data packet in the broadcast signal is read by the magnetic reader head during said swipe and the swipe speed is measured by a passive sensor.

The swipe speed is measured by a passive speed sensor. The passive speed sensor (which can be made of a quantum tunneling composite) can either be a combination of outer and inner passive sensors placed across track 1 and track 2 locations of the electronic card or the inner passive sensor can be placed along the track 1 location or the passive speed sensor can be a single passive sensor either placed along the track 1 location or across the track 1 and track 2 locations.

The broadcast signal is adjusted by varying a current used to broadcast said broadcast signal, the magnetic stripe data packet can have a track 2 data packet and/or a track 1 data packet and cross talk in the magnetic reader head is prevented by use of a cross talk blocker such as a piece of magnetic tape located on the electronic card so as to prevent cross talk.

The electronic card is first activated from an off state to a sleep mode, then converted to an active mode after a wake up sensor is activated during a swipe of the electronic card past a magnetic reader head, and then the swipe speed of the electronic card past the magnetic reader head during the swipe is measured and used to adjust a broadcast signal containing a magnetic stripe data packet which is broadcast during the swipe so that the magnetic reader head reads the magnetic stripe data packet. False swipe detection can be prevented by measuring movement past an outer detection point and an inner detection point of a capacitive sensor used to measure swipe speed. The broadcaster does not need to be activated until the electronic card is in the active mode.

Accordingly, it is a primary object of the present invention to provide a method for broadcasting a magnetic stripe data packet from an electronic card so that it is read by a magnetic card reader during a swipe of the electronic card.

This and further objects and advantages will be apparent to those skilled in the art in connection with the drawings and the detailed description of the invention set forth below.

BRIEF DESCRIPTION OF THE DRAWINGS

FIG. 3 depicts a front side of an electronic smart card in accordance with the present invention with a front cover in place.

FIG. 4 depicts an alternative arrangement of a back side of an electronic smart card in accordance with the present invention with a back cover in place.

FIGS. 15-18 illustrate four different designs of passive sensor configurations that can be used to detect the speed of a card swipe.

DETAILED DESCRIPTION OF THE INVENTION

Figure 2:
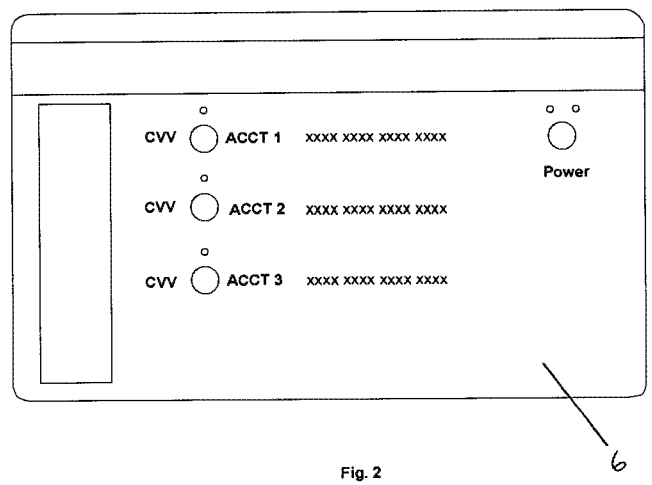
FIG. 2 depicts the back side of an electronic smart card in accordance with the present invention with a back cover in place.
Figure 1:
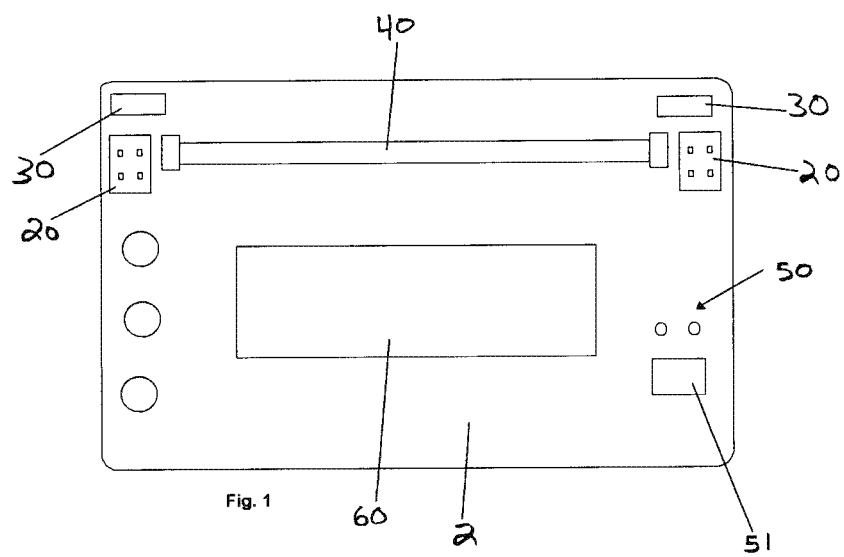
FIG. 1 depicts the back side of an electronic smart card in accordance with the present invention with a back cover removed and certain components shown diagrammatically on a printed circuit board ("PCB").

As this application is a continuation-in-part application which includes improvements over the inventions described in an earlier application, the original inventions will be described first, and then the new improvements will be disclosed.

The inventions will now be discussed in connection with one or more preferred embodiments shown in the Figures. In the Figures and the following more detailed description, numerals indicate various features of the invention, with like numerals referring to like features throughout both the drawings and the description. Although the Figures are described in greater detail below, the following is a glossary of the elements identified in the Figures.

1 electronic smart card
2 printed circuit board (PCB)
3 extra piece of PCB added to PCB 2
5 front cover of card 1
6 back cover of card 1
15 front side of card 1
16 back side of card 1
20 trip switch
21 distance between extra PCB pieces needed to complete electrical trip switch 20
22 extra piece of PCB added to PCB 2
23 electrical trace
24 extra piece of PCB added to PCB 2
25 extra piece of PCB added to PCB 2
26 electrical trace
27 extra piece of PCB added to PCB 2
30 capacitor speed sensor
31 outer detection pad
32 inner detection pad
33 piece of PCB added to PCB 2
34 conductive pad
40 broadcaster
40T broadcaster coil terminal
43 strip of magnetic tape
50 electronics
51 processor or micro controller unit (MCU)
60 battery
61 capacitive sensor
62 capacitive sensor
63 capacitive sensor
64 on/off button
65 7816 chip plate
66 security hologram
67 signature strip
71 account number
72 account number
73 account number
74 expiration date and CVV for account number 71
75 expiration date and CVV for account number 72
76 expiration date and CVV for account number 73
77 light emitting diode (LED)
81 branding
82 embossed primary account number
83 embossed user name
84 embossed expiration date
100 reader head
101 outer passive sensor
102 inner passive sensor
103 single thin passive sensor
104 single wide passive sensor The original inventions provide for a method for broadcasting a magnetic stripe data packet from an electronic card so that it is read by a magnetic card reader during a swipe of the electronic card. As noted in the original application, a preferred embodiment of the original inventions provides an electronic smart card, shown generally as 1 in FIG. 3, having a printed circuit board (PCB) 2 enclosed within a front cover 5 on a front side 15 and a back cover 6 on a back side 16. Back side 16 of card 1 is orientated such that it functions similarly to a back side of a conventional credit card having a magnetic stripe on its back side.

Electronic smart card 1 should be usable in situations where a smart card reader is used and in applications where a card is read by a conventional magnetic stripe reader. Accordingly, electronic smart card 1 should satisfy the ISO 7816 standard for smart cards, incorporated herein by reference, and the ISO 7810 standard for transaction cards, also incorporated herein by reference. Details relating to both ISO standards and electronics, dimensions and other details needed to meet both standards, is set forth in U.S. Patent Application Publication 20070034700, published Feb. 15, 2007, entitled "Electronic cards and methods for making same," the disclosure of which is specifically incorporated herein by reference and hereinafter referenced as "Electronic Cards."

Electronic smart card 1 should have two processors or micro controllers for performing secure and non-secure functions as detailed in Electronic Cards. Alternatively, a single processor or micro controller can be used to replace the secure and non-secure processors described in Electronic Cards so long as it has suitable input/output ports and divided memory so that it functions equivalently to the secure and non-secure processors described in Electronic Cards. For purposes of the present invention, it will be presumed that MCU 51 is such a combined processor or a combination of a secure and non-secure processor as described in Electronic Cards.

Processor or micro controller unit 51 (whether it be a single processor or a combination of two processors) is mounted to PCB 2 as are other electronics, generally designated as 50, necessary for electronic smart card 1 to function. Details of electronics 50 are not critical to the present invention and should be well within the skill of a person of ordinary skill in the art, especially when viewing the teachings of Electronic Cards and the teachings of the present invention.

Front side 15 of electronic smart card 1 (see FIG. 3) has a 7816 chip plate 65 and can having branding 81, an embossed primary account number 82, an embossed user name 83 and embossed expiration date 84. Embossed primary account number 82, embossed name 83 and embossed expiration date 84 are located according to the ISO 7816 standard and meet its requirements.

Back side 16 of electronic smart card 1 (see FIG. 4) has a signature strip 67 and hologram 66 that satisfy the ISO 7816 standard (like conventional transactions cards). However, unlike conventional transaction cards, electronic smart card 1 has three capacitive sensors (61-63) for accessing three different accounts whose account numbers (71-73) and combined expirations dates with CVV (74-76, respectively) are printed on back cover 6. LEDs 77 alongside sensors 61-63 indicate to a user which, if any, of account numbers 71-73 has been selected for use. (Note that in an especially preferred embodiment account number 71 is the same as embossed primary account number 82 and embossed expiration date 83 is contained in expiration date with CVV 74.) Also accessed from back side 16 is an on/off switch 64. A strip of magnetic tape 43 is also located on back cover 6 and positioned so as to prevent cross talk between a reader head that can detect both track 1 and track 2 data from a conventional magnetic stripe. Such positioning is keyed to location of where track 1 and track 2 data would be in a conventional magnetic stripe card following ISO standard 7810 and is thus located between where such data would be in such a card.

Electronic smart card 1 of the present invention uses a broadcaster 40 for broadcasting a broadcast signal during a swipe of the card so that a magnetic stripe reader head can read a magnetic stripe data packet contained in the broadcast signal. The broadcast signal may contain track 1 and/or track 2 data (or, if desired, track 3 data as well). The present invention is not concerned with details of a broadcaster, although such a broadcaster can actually take the form of separate broadcasters so that a given broadcaster only broadcasts the data for a given track of data as is explained in greater detail in Electronic Cards. It should be noted, however, that it has been found that the problem of cross talk (discussed in greater detail in Electronic Cards) can be effectively dealt with by use of a magnetic stripe positioned on back cover 6 as already noted above. This method of dealing with cross talk is much simpler, cheaper to implement and more efficient than broadcasting a cancellation signal to prevent cross talk and represents a significant advance in the prevention of cross talk in an electronic card that broadcasts data to a magnetic stripe reader head.

Attached to PCB 2 oriented toward back side 16 of card 1 are two wake up sensors in the form of trip switches 20 and two speed sensors 30 oriented toward the side ends of card 1 in the proximate area of card 1 where a magnetic stripe is located in a conventional magnetic stripe card according to ISO standard 7810. Two wake up sensors and speed sensors are included so that electronic card will function when read by a magnetic stripe reader in either a left to right or right to left swipe direction.

Figure 5:
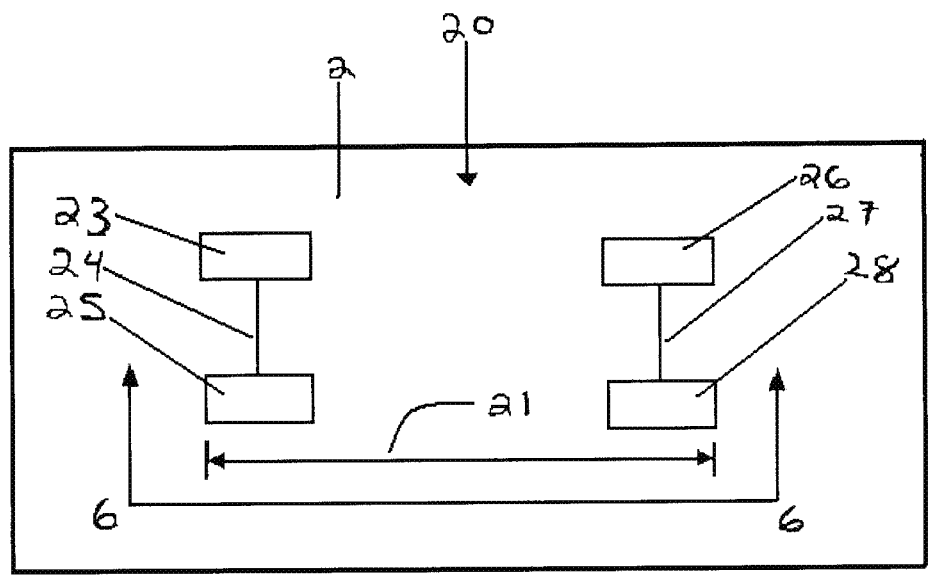
FIG. 5 depicts a trip switch used in a preferred embodiment of the present invention looking down onto a PCB on which the trip switch is constructed.
Figure 6:
FIG. 6 is a cross sectional view of the trip switch taken along view 6-6 of FIG. 5.
Figure 7:
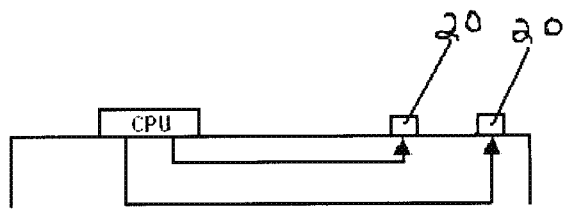
FIG. 7 illustrates the electronic functioning of the trip switch of FIG. 5.

Each wake up sensor or trip switch 20 is located such that it will be triggered by a magnetic reader head 100 during a swipe of electronic smart card 1 before magnetic reader head passes over any portion of broadcaster 40 FIGS. 5-7 depict a wake up sensor in the form of trip switch 20. Trip switch 20 functions as a simple on/off switch that is triggered when magnetic reader head 100 passes over it. In an especially preferred embodiment, trip switch 20 has two PCB pieces 23 and 25 connected by trace 24 built upon PCB 2 and a second set of two PCB pieces 26 and 28 connected by trace 27 also built upon PCB 2. Two sets of PCB pieces are used to ensure that reader head 100 passes over one of the sets (of course, a larger set of PCB pieces could be used, but it would be less efficient and more expensive). The distance 21 between the two sets of PCB pieces 23/25 and 26/28 is less than the width of magnetic reader head 100 so that trip switch 20 will be triggered as magnetic head 100 passes over it. FIG. 7 shows a conceptual diagram of the function of trip switch 20. Each trip switch 20 is electrically connected to MCU 51. MCU 51 is triggered to an active mode when it receives an activation signal from one of trip switches 20.

Although electronic smart card 1 can function without use of wake up sensors, they are included in an especially preferred embodiment because they help to prolong the life of battery 60. Because electronic smart card 1 uses a broadcaster 40, broadcaster 40 will consume energy from battery 60 when it is in an active mode. When a user activates electronic smart card 1 by turning it on through on/off button 64, electronic card 1 will be consuming energy from battery 60. However, through use of trip switches 20, broadcaster 40 will remain in a sleep mode and not be powered up into an active mode until one of trip switches 20 is activated, thus minimizing power consumption by broadcaster 20.

Speed detection is critical for MCU 51 of electronic smart card 1 to determine the rate of broadcast by broadcaster 40. There are various ways of determining the speed of card 1 travelling across a reader head, such as photo sensor. However, it is especially preferred that a capacitive sensor is used for speed detection because it offers the advantages of a very low profile, relatively low cost and relatively low power consumption.

Each speed sensor 30 is located such that it will be triggered by magnetic reader head 100 after it has activated a trip switch 20 and before magnetic reader head 100 passes over that portion of broadcaster 40 that conveys a broadcast signal to magnetic reader head 100 during a swipe of electronic smart card 1. Although speed sensors 30 can take different forms, in an especially preferred embodiment, each speed sensor 30 is comprised of a capacitive sensor having an inner detection pad 31 and an outer detection pad 32, the outer detection pad being closer to the outside side edge of card 1. Outer and inner detection pads 31 and 32 are comprised of PCB pieces 33 and a conductive layer of material 34 (such as copper or silver). The purpose of PCB pieces 33 is to move conductive layer of material 34 up closer to reader head 100. Outer and inner detection pads 31 and 32 are electrically connected to MCU 51.

Capacitive speed sensors 30 work based on the principle of charge-transfer signal acquisition for robust sensing. The acquisition method charges a conductive layer of material (or pad) 34 of unknown capacitance (Cx) to a known potential. The resulting charge is transferred into a measurement capacitor (Cs). The charge cycle is repeated until the voltage across Cs reaches the required voltage. The number of charge-transfer cycles it takes to reach a voltage (Vih) is called signal level of measurement capacitor Cs. Placing a finger on the touch surface introduces an external capacitance (Ct) that increases the amount of charge transferred each cycle and hence it reduces the signal lever/number of transfer cycles required for Cs to reach the voltage. When the number of cycles reduces more than the present threshold, then the sensor is reported as in detect whereas the sensor identifies a false detect when the number of cycles exceeds the present threshold.

Figure 8:
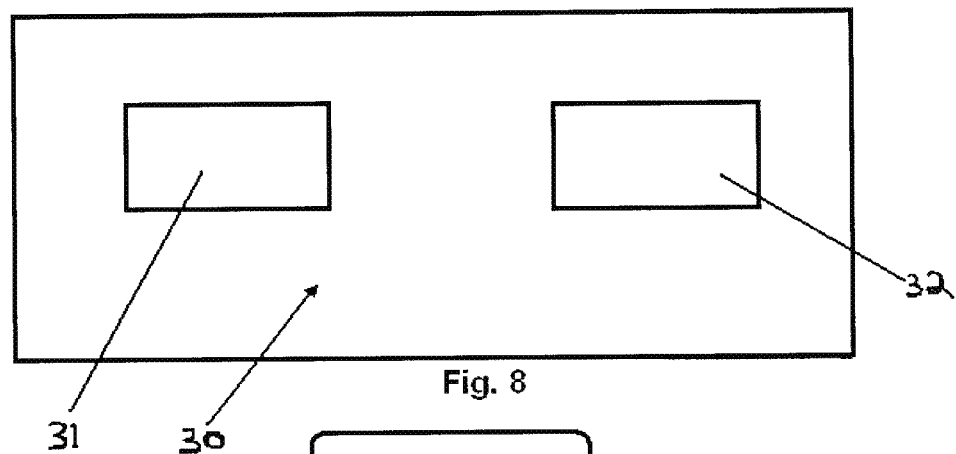
FIG. 8 depicts a speed sensor used in a preferred embodiment of the present invention looking down onto a PCB on which the speed sensor is constructed.
Figure 9:
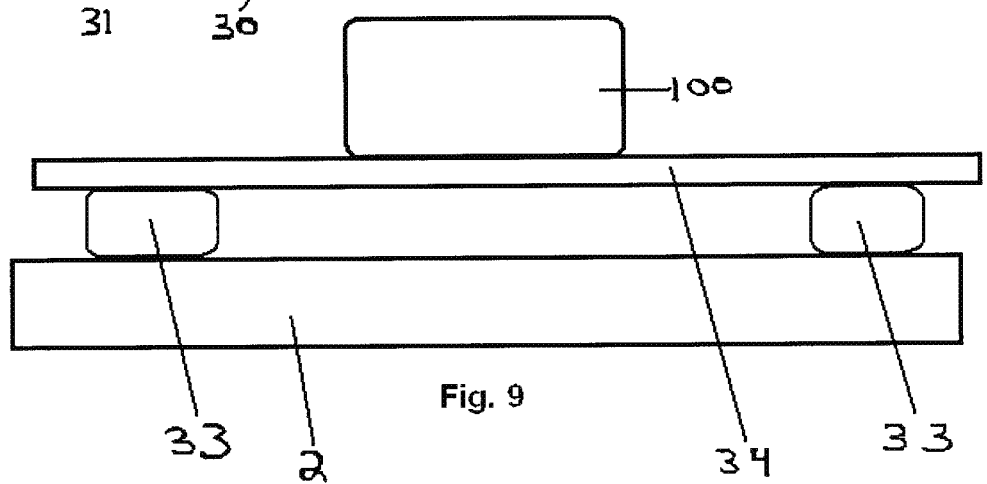
FIG. 9 is a cross sectional view of the speed sensor of FIG. 8 with a representation of a reader head pressing against the speed sensor during a swipe.
Figure 10:
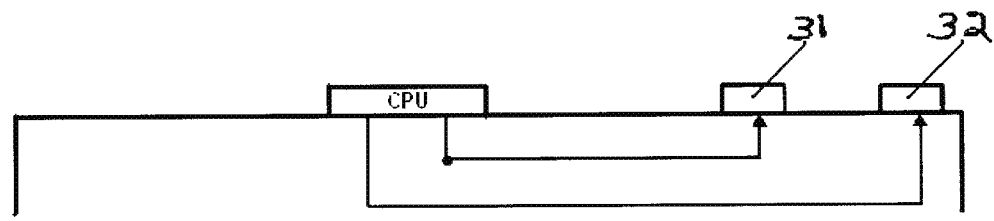
FIG. 10 illustrates the electronic functioning of the speed sensor of FIG. 8.
Figure 11:
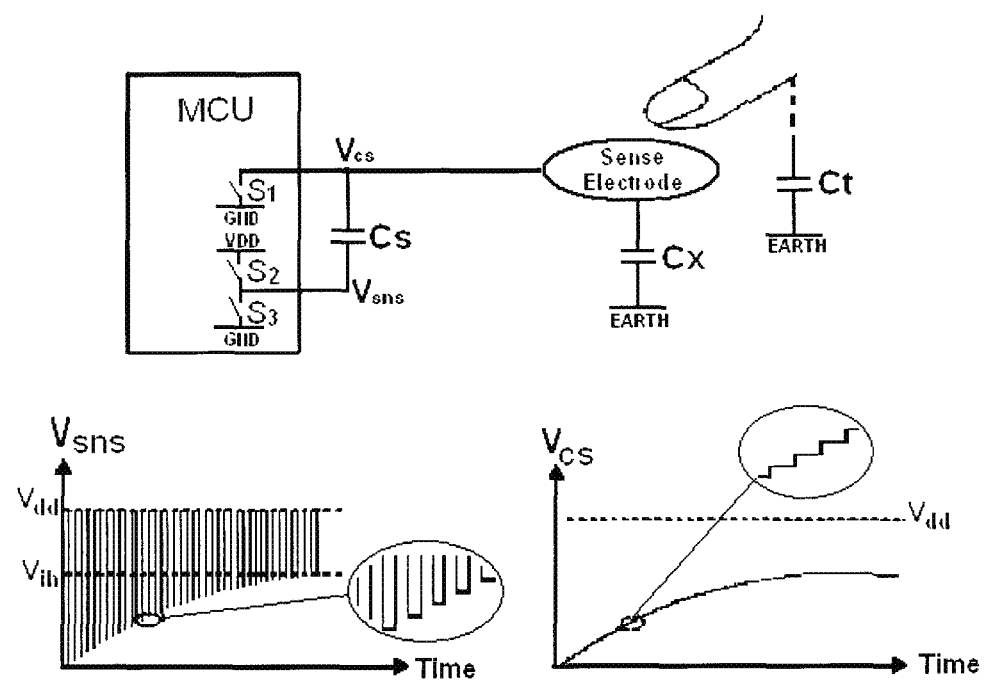
FIG. 11 illustrates the charge transfer working principal used in capacitive sensors.
Figure 12:
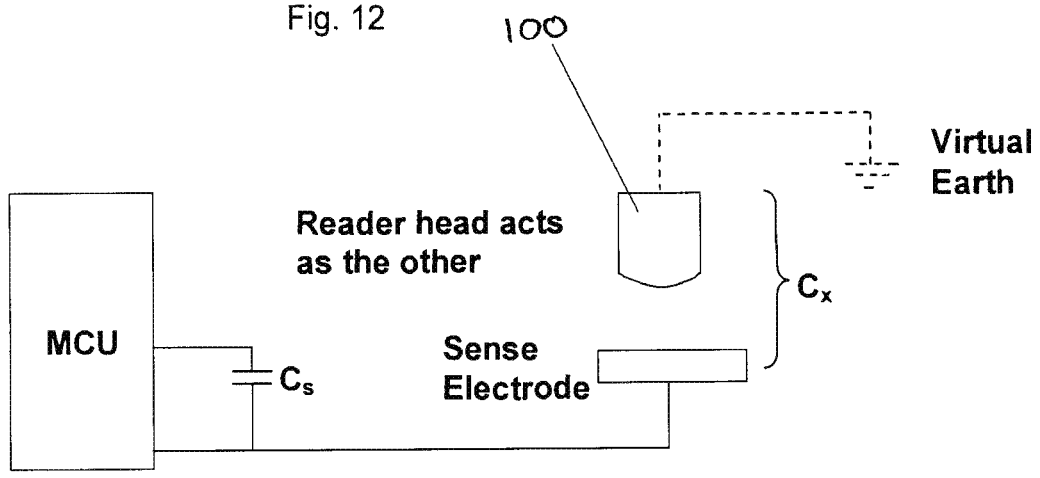
FIG. 12 illustrates a processor or micro controller measuring the number of charge transfer cycles and determining the speed of a card swipe using the touch-profile method.

Based on the charge transfer principle, the dielectric of the capacitor is the material between the magnetic reader head and pad 34. In an embedded design, dielectric of the capacitor is formed by overlay and FR4 material whereas in a chip plate design, dielectric of the capacitor is formed by the overlay alone. In both designs, the conductive pad forms one of the electrodes of a capacitor. The magnetic reader head acts as the other electrode of the capacitor, which also provides a virtual ground to the resulted capacitor. This is shown in FIG. 12. There are two different especially preferred designs for a capacitive sensor useful in the present invention as a swipe speed detection sensor. The first design is using a copper pad embedded on a top side rear of main PCB 2 and the second design is using a 0.4 mm thick chip plate PCB to elevate the copper pad off of top side rear of main PCB 2 as shown in FIG. 8.

Keeping the sense capacitance value ($C_s$) unchanged, the separation between the magnetic reader head and the capacitive sensor is critical for the sensitivity of the capacitive sensor. The larger the separation, the less sensitive the capacitive sensor it is. Comparing the two designs, the separation between the magnetic reader head and the capacitive sensor is 0.075 mm in the chip plate design of FIG. 8. This is a much smaller gap distance as compared to approximately 0.5 mm separation distance in the embedded pad design. Therefore, it is expected that the capacitive sensor in the chip plate design has better sensitivity as compared to that in the embedded pad design. Nevertheless, the embedded pad design is simpler as compared to the chip plate design.

The firmware implementation for swipe speed, inch per second ($S_{ips}$), detection will be based on the time stamps, $T_1$ and $T_2$, marked at the edges of the sensor's touch profile, which is generated when the reader head travels over the capacitive sensor pad of length $L_{pad}$. It is important that the detection method is independent of the magnetic reader head. This is because the capacitance and the dimension of the magnetic reader head are different from one reader head to another. The touch-profile method depends only on the length of the sensor pad and any variation of the magnetic reader head will not affect the speed detection accuracy. Hence, the swipe speed in inches per second ($S_{ips}$) is calculated as:

$$S_{ips}=L_{pad}/(T_2-T_1) \quad \text{Equation 1}$$

Figure 14:
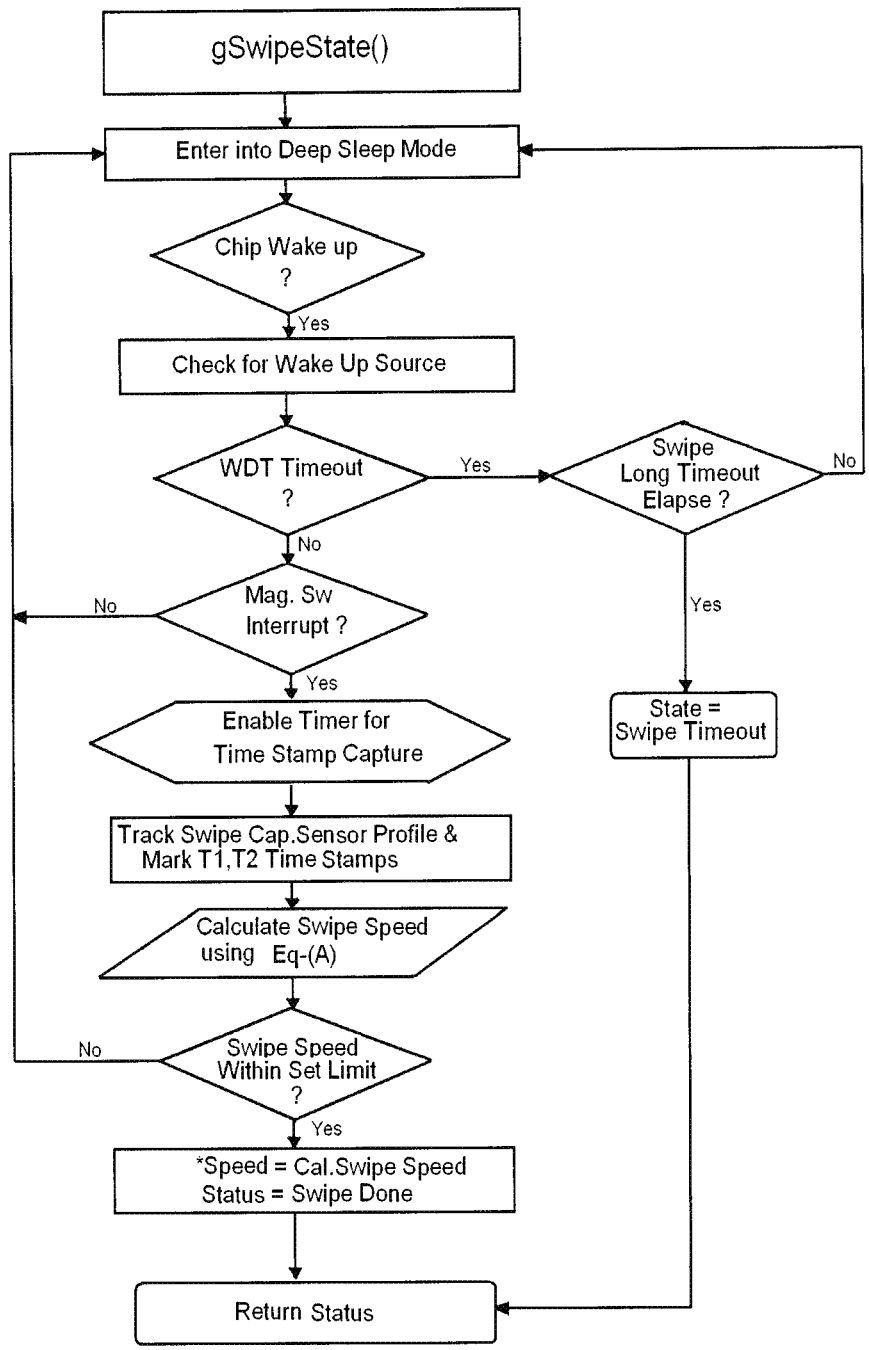
FIG. 14 is a flow chart illustrating the steps of a preferred embodiment in which a broadcaster is activated by use of sensors.

The sequential flow of firmware in SWIPE state (see FIG. 14) is detailed as:

A non-secure chip shall be put into deep sleep mode until it is woken up by the wake up source, WDT timeout/External interrupt, to transition into active/normal state.

If the chip is woken up by WDT timeout then it checks for Swipe Long Timeout elapse and enters back to sleep mode until the swipe timeout elapse.

If the chip is woken up by an external interrupt source, from one of the trip switch/sensors populated at either side of the card, which in turn decides the direction of the swipe, enables the swipe/capacitive sensor touch profile capture for speed detection until Swipe Short Timeout elapse.

Figure 13:
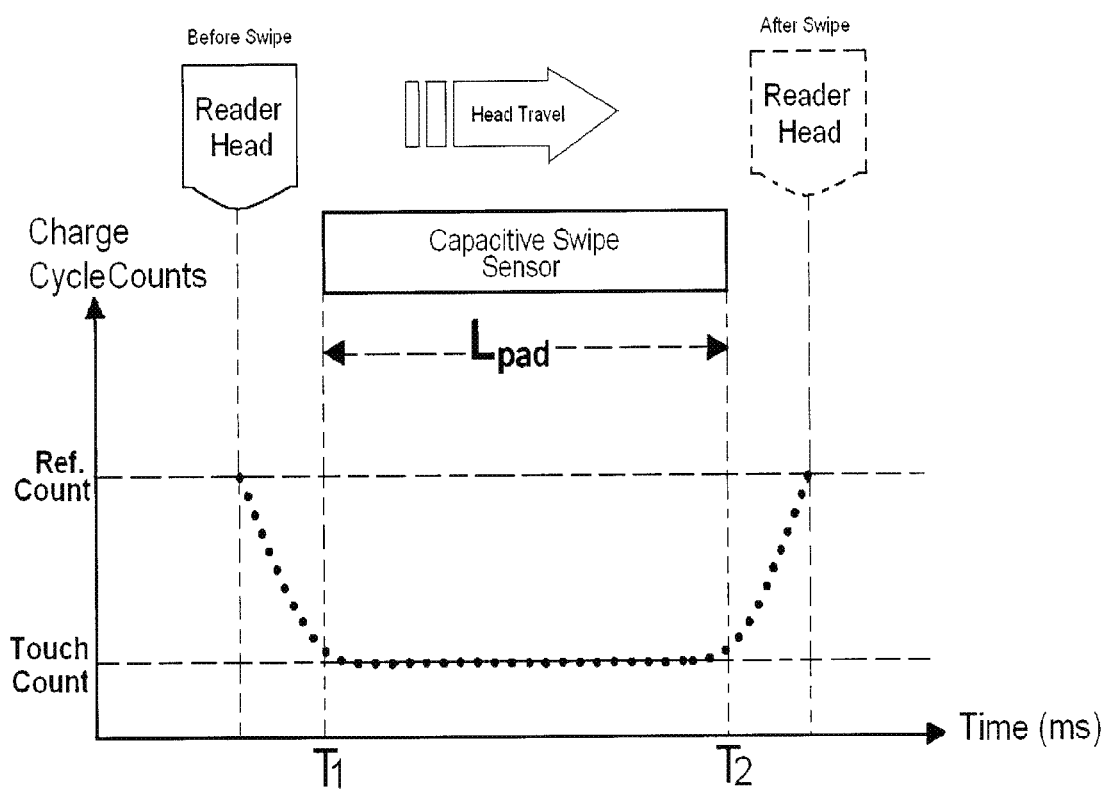
FIG. 13 illustrates a capacitive/swipe sensor's touch profile (right/left side pad) generation when a reader head travels over a capacitive sensor pad situated at left/right side of an electronic smart card according to a preferred embodiment of the present invention. Note, however, in an actual case, the capacitive sensor pad on the card travels over the reader head.

As shown in the above, FIG. 13, the difference count from reference to touch is dynamically monitored until the difference count reaches the maximum, where the time stamp $T_1$ is marked. The time stamp $T_2$ shall be marked when the difference count starts decreasing from its maximum value.

The swipe speed in inch per second ($S_{ips}$) will be calculated based on the profile time stamps and capacitive sensor pad length by using Equation A.

The swipe speed calculated shall be compared with minimum, medium and maximum speed threshold levels to decide the broadcast data rate through coil terminals. It is especially preferred that there be three discrete levels to broadcast data by broadcaster 40 based on the detected speed:

a) Slow 5 IPS≤Swipe Speed<10 IPS, data rate=3750 bits/sec b) Medium 10 IPS≤Swipe Speed<20 IPS, data rate=7500 bits/sec c) Fast Swipe Speed≥20 IPS, data rate=10000 bits/sec Although the data transmission rate changes according to different swipe speed range, the read amplitude remains constant. If swiping a conventional mag-stripe card at the speed of 50 IPS produces read amplitude of 3Vp-p, then electronic smart card 1 will produce the same read amplitude regardless of swipe speed and broadcast card with the MCU will produce read amplitude of 6Vp-p.

If the set data rate is within the boundary condition, the swipe state will be transitioned to BROADCAST state by 'gSwipe2Broadcast( )' function.

After BROADCAST state, the chip enters back to SWIPE state until the Swipe Short Timeout elapse.

The Detailed Description of the Invention so far has set forth what was disclosed in the earlier application of which this is a continuation-in-part. What follows are additional disclosures and new inventions that build upon the original disclosure. The capacitive sensor set forth in the earlier application is an example of an active sensor. An active sensor is characterized by the fact that it operates in an active mode consuming energy while it is waiting to be used to detect speed. Examples of other active sensors that might be used include a Hall-effect sensor or an inductive sensor.

It is also possible to use passive sensors as speed sensors to measure swipe speed. In contrast to an active sensor, a passive sensor uses pressure/force to activate the sensor which behaves like an on/off switch. When unstressed, the passive sensor behaves like an insulator, having very high resistance, acting as an opening circuit electrically. When stressed, the resistance of the sensor reduces and behaves like a conductor, acting as a short circuit electrically.

An advantage of using a passive sensor to detect swipe speed is lower energy consumption. Unlike an active sensor, the passive sensor does not consume energy in an active state waiting to detect speed, which also means that it does not require a wake up switch to turn it on and prepare it to detect swipe speed.

In an especially preferred embodiment, the passive sensor can use a quantum tunnelling composite ("QTC") such as is available from Peratech Limited of the UK. As is explained in the website for Peratech Limited, QTC is new class of electrically conductive material developed to advance the capability of switching and sensing systems. QTC is an electrically conductive material that has the ability to smoothly change from an electrical insulator to a metal-like conductor when placed under pressure. While in an unstressed state the QTC material is a near perfect insulator, with any form of deformation the materials starts to conduct and with sufficient pressure metallic conductivity levels can be achieved. This means that QTC can be used as a solid state switch which can be used to detect even very small changes due to compression, tension or other stresses caused by the reader head as it moves over a smart card 1 according to the present invention. Additional details regarding a QTC switch are set forth in publication WO/2010/109186 published Sep. 30, 2010, which was based upon patent application PCT/GB2010/000546, the disclosure of which is specifically incorporated herein by reference.

It should also be noted that a passive sensor, preferably using QTC, can also be used as a trip switch to activate an active sensor or to replace capacitive sensors 61-63.

FIGS. 15-18 disclose four different designs of a smart card 1 that uses QTC sensors, instead of capacitive sensors, to detect the swipe speed.

Figure 15:
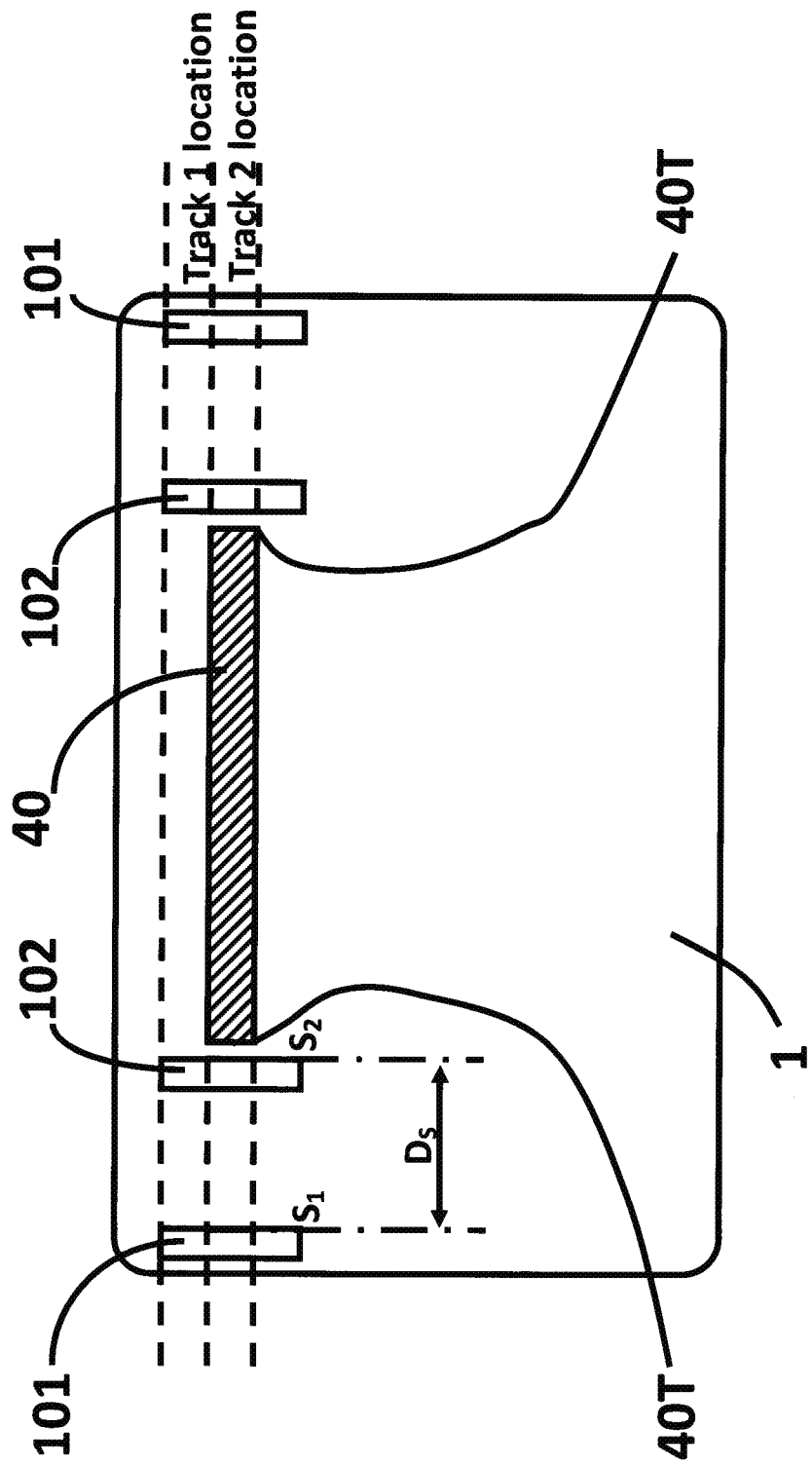

In a first design shown in FIG. 15, two vertically parallel passive sensors 101 and 102 are placed next to each terminal 40T of broadcaster 40, across Track1 and Track2 locations. When the magnetic reader head passes the two sensors, it activates the sensors one by one. By monitoring the time elapsed between the two activations, swipe speed can be calculated. To broadcast the data, a software delay can be introduced in order to avoid the low flux area along the broadcaster coil terminal 40T. Since swipe speed detection depends on the time between $T_1$ and $T_2$, it requires the sensor to have fast response time in order to have two distinct pulses due to the activation of the sensors. The swipe speed in inches per second ($S_{ips}$) is calculated as:

$$S_{ips} = D_S/(T_2-T_1) \quad \text{Equation 2}$$

where $D_S$ is the distance between the two sensor points $S_1$ and $S_2$. Note that while sensor points $S_1$ and $S_s$ are shown in FIG. 15 as being at the inward side of the edges of parallel passive sensors 101 and 102, they need not be located only at this point, as long as the correct location is taken into account in the software calculations. More particularly, the software calculations will calculate when the broadcast signal should be broadcast based upon the calculated swipe speed and necessary time delay, and the software will calculate the frequency of the broadcast signal so that it will not miss the read head during the swipe.

Figure 16:
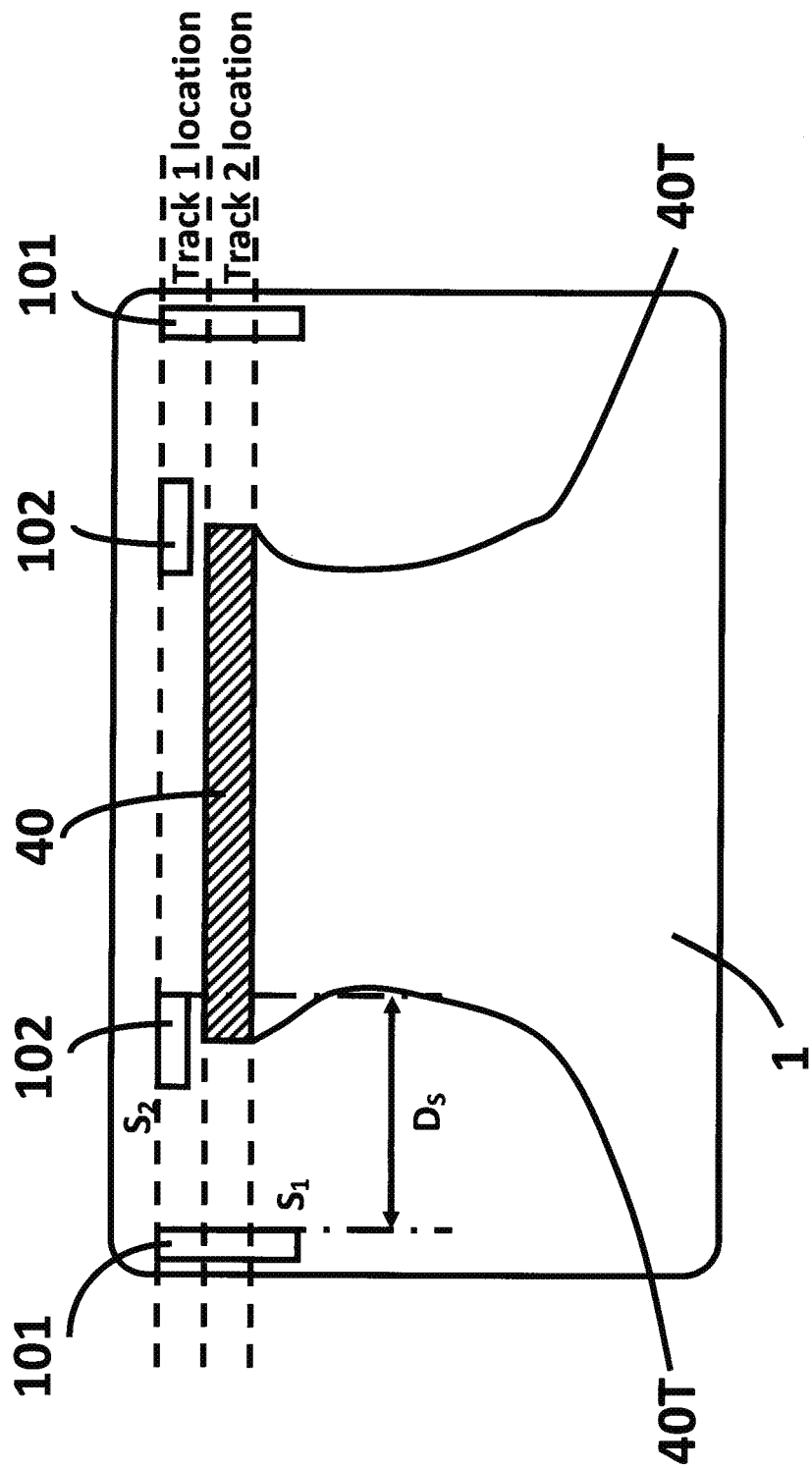

In a second design shown in FIG. 16, the outer passive sensor 101 is still placed across Track1 and Track2 locations, but the inner passive sensor 102 is placed along Track1 location, above the broadcaster 40. One advantage of this component placement scheme is that it will allow the data broadcasting to take place essentially immediately after inner sensor 102 becomes an open circuit and a programmed software delay is no longer required because the reader head will be beyond broadcaster coil terminal 40T due to placement of inner passive sensor 102. Another advantage of this component placement scheme is that the distance between inner and outer passive sensors 101 and 102 is greater which can lead to more accurate speed measurement. Again, since swipe speed detection depends on the time between $T_1$ and $T_2$, it requires the sensor to have fast response time in order to have two distinct pulses due to the activation of the sensors. In this scheme, sensor point $S_1$ is shown in FIG. 16 as being at the inward side of the edge of parallel passive sensor 101, although it need not be located only at this point, as long as the correct location is taken into account in the software calculations. By contrast, it is useful for sensor point $S_2$ shown in FIG. 16 to be located at the inward side of the edge of parallel passive sensor 102 in calculating the software delay introduced in order to avoid the low flux area along the broadcaster coil terminal 40T. In this scheme, the software calculations will calculate when the frequency of the broadcast signal so that it will not miss the read head during the swipe.

In a third design shown in FIG. 17, a single passive sensor 103 is placed next to each side of the broadcaster coil and it is along the Track1 location. The inner edge of the sensor can be used to trigger the data broadcasting. The time taken from the instant the magnetic reader head touches the outer edge of the sensor to the instance it leaves the sensor will be used to calculate the swipe speed and a programmed software delay to avoid broadcasting along broadcaster coil terminal 40T is not required. Requirement of the sensor response time is less stringent as compared to the first and second designs as the length of the sensor in this design is much longer and the rise time and fall time is insignificant as compared to $(T_2-T_1)$. The swipe speed in inches per second ($S_{ips}$) in this scheme is calculated using Equation 1 in which $L_{pad}$ is replaced by $L_{sensor}$ and $L_{sensor}$ represents the length of passive sensor 103.

In a fourth design shown in FIG. 18, a larger passive sensor 104 is placed next to each side of the broadcaster 40 and it covers all the track locations. This design has the advantage of ensuring better actuation area between the magnetic reader head and the sensor and the width of the sensor is matching the width of the magnetic reader head. However, a software delay is required in this design in order to broadcast the data after the low flux region along the broadcaster coil terminal 40T. The swipe speed in inches per second ($S_{ips}$) in this scheme is calculated using Equation 1 in which $L_{pad}$ is replaced by $L_{sensor}$ and $L_{sensor}$ represents the length of passive sensor 104.

While the invention has been described herein with reference to certain preferred embodiments, those embodiments have been presented by way of example only, and not to limit the scope of the invention. Additional embodiments thereof will be obvious to those skilled in the art having the benefit of this detailed description. For example, the present disclosure and FIGS. 2 and 4 illustrate an electronic smart card having three different visible account numbers, whereas additional account numbers could be added. Also, a visual display device could be added for displaying the account chosen by a user. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A method comprising broadcasting a transaction specific magnetic stripe data packet from an electronic card by measuring a swipe speed of the electronic card past a magnetic reader head during a swipe of the electronic card past the magnetic reader head and then adjusting a broadcast signal containing the transaction specific magnetic stripe data packet according to the measured swipe speed so that the transaction specific magnetic stripe data packet in the broadcast signal is read by the magnetic reader head during said swipe, wherein the swipe speed is measured by a passive speed sensor.

2. The method of claim 1 wherein the passive speed sensor is comprised of an outer passive sensor and an inner passive sensor and both the outer passive sensor and the inner passive sensor are placed across a track 1 location and a track 2 location of the electronic card.

3. The method of claim 2 wherein the broadcast signal is not broadcast until the magnetic reader head has traveled beyond a broadcast terminal of a broadcaster of the electronic card.

4. The method of claim 1 wherein the passive speed sensor is comprised of an outer passive sensor placed across a track 1 location and a track 2 location of the electronic card and an inner passive sensor placed along the track 1 location of the electronic card.

5. The method of claim 1 wherein the passive speed sensor is comprised of a passive sensor placed along a track 1 location of the electronic card.

6. The method of claim 1 wherein the passive speed sensor is comprised of a passive sensor placed across a track 1 location and a track 2 location of the electronic card.

7. The method of claim 6 wherein the broadcast signal is not broadcast until the magnetic reader head has traveled beyond a broadcast terminal of a broadcaster of the electronic card.

8. The method of claim 6 wherein the broadcast signal is adjusted by varying bit rate used to broadcast said broadcast signal.

9. The method of claim 1 wherein the transaction specific magnetic stripe data packet is comprised of a track 2 data packet.

10. The method of claim 9 wherein the transaction specific magnetic stripe data packet is further comprised of a track 1 data packet.

11. The method of claim 10 wherein cross talk in the magnetic reader head responsible for reading track 1 data is prevented by use of a cross talk blocker.

12. The method of claim 11 wherein the cross talk blocker is a cancelation coil located on the electronic card so as to prevent cross talk.

13. A method, comprising:
activating an electronic card from an off state to a sleep mode;
changing the electronic card from the sleep mode to an active mode after a wake up sensor is activated during a swipe of the electronic card past a magnetic reader head;
measuring a swipe speed of the electronic card past the magnetic reader head during the swipe;
using the swipe speed to adjust a broadcast signal containing a transaction specific magnetic stripe data packet; and
broadcasting the transaction specific broadcast signal during the swipe so that the magnetic reader head reads the magnetic stripe data packet.

14. The method of claim 13 further comprising using a processor to generate the broadcast signal once the swipe speed is measured.

15. The method of claim 13 wherein the swipe speed is measured by an active sensor having an outer detection point and an inner detection point.

16. The method of claim 15 wherein a false swipe detection is prevented by measuring movement past the outer detection point and the inner detection point.

17. The method of claim 13 wherein a broadcaster in the electronic card is activated during the active mode.

18. The method of claim 17 wherein the broadcast signal is adjusted by varying a bit rate used by the broadcaster to broadcast said broadcast signal.

19. The method of claim 17 wherein the broadcaster is comprised of a track 2 broadcaster that broadcasts a track 2 data packet and a track 1 broadcaster that broadcasts a track 1 data packet.

20. The method of claim 13 wherein a cross talk blocker is used to prevent the magnetic reader head from reading a particular track data packet in a reading area of the magnetic reader head that is not meant to read the particular track data packet.

* * * * *